United States Patent
Darachi et al.

(10) Patent No.: US 11,113,026 B2
(45) Date of Patent: Sep. 7, 2021

(54) SYSTEM AND METHOD FOR VOICE-DIRECTED WEBSITE WALK-THROUGH

(71) Applicants: Adi Darachi, Tel-Mond (IL); Dan Kotlicki, Netanya (IL)

(72) Inventors: Adi Darachi, Tel-Mond (IL); Dan Kotlicki, Netanya (IL)

(73) Assignee: Toonimo, Inc., New York, NY (US)

( * ) Notice: Subject to any disclaimer, the term of this patent is extended or adjusted under 35 U.S.C. 154(b) by 0 days.

(21) Appl. No.: 16/214,051

(22) Filed: Dec. 8, 2018

(65) Prior Publication Data

US 2019/0377544 A1 Dec. 12, 2019

Related U.S. Application Data

(60) Provisional application No. 62/596,626, filed on Dec. 8, 2017.

(51) Int. Cl.
*G10L 15/00* (2013.01)
*G06F 3/16* (2006.01)
*G10L 15/22* (2006.01)
*G10L 15/16* (2006.01)

(52) U.S. Cl.
CPC .............. *G06F 3/167* (2013.01); *G10L 15/16* (2013.01); *G10L 15/22* (2013.01); *G10L 2015/223* (2013.01)

(58) Field of Classification Search
None
See application file for complete search history.

(56) References Cited

U.S. PATENT DOCUMENTS

| 2003/0104839 | A1* | 6/2003 | Kraft | H04M 1/2748 455/566 |
|---|---|---|---|---|
| 2004/0030556 | A1* | 2/2004 | Bennett | G09B 19/06 704/270 |
| 2007/0100635 | A1* | 5/2007 | Mahajan | G10L 15/22 704/276 |
| 2016/0203002 | A1* | 7/2016 | Kannan | G06F 9/453 715/708 |

* cited by examiner

*Primary Examiner* — Edgar X Guerra-Erazo
(74) *Attorney, Agent, or Firm* — Clifford H. Kraft

(57) ABSTRACT

A system and method for a user to receive voice prompts and to talk to a website stating what they desire to do. Speech-to-text (speech recognition) and text-to-speech or pre-recorded voice along with graphic overlay provide user guidance. Upon accessing a website, special code is transferred to the client browser from the site server. If the client computer's application interface supports speech recognition and/or text to speech, some or all speech conversions can be performed on the client side. If not, the speech processing can be performed on a dedicated private control site or by an external site that provides speech processing services, or as a distributed service in an on premise installation. After speech is converted to text, an artificial intelligence module, attempts to determine intent. Once intent is determined, correct commands can be sent to the website to bring up proper pages and/or walkthroughs and/or answers.

14 Claims, 3 Drawing Sheets

SYSTEM AND METHOD FOR VOICE-DIRECTED WEBSITE WALK-THROUGH

This application is related to and claims priority to U.S. Provisional Patent Application No. 62/596,626 filed Dec. 8, 2017. Application 62/596,626 is hereby incorporated by reference in its entirety.

BACKGROUND

Field of the Invention

The present invention relates generally to the field of website control and more particularly to a system and method for voice-directed walk-throughs of particular websites.

Description of the Problem Solved

Many times users have difficulties navigating web sites. In particular, they may not be able to immediately get to the page they desire even though they know exactly what they want to do. For example, they might want to pay a telephone bill. They may log onto the telephone provider's website, and be barraged with ads for new telephones and new services. They may have to search and search to find a tab or button that allows them to simply pay their telephone bill. Another example might be an airline reservation site. The user wants to fly from their hometown to San Francisco on the 20th of the month. It may take considerable time on the airline's site to get that information into their server and search engine. Even the simple act of logging off of a site when one has signed on may be difficult to do. It would be extremely advantageous if the user could simply speak what they want and have the "computer" understand what they want and immediately bring up the correct page from a site.

SUMMARY OF THE INVENTION

The present invention provides a system and method for a user to receive voice prompts and to talk to a website stating what they desire to do. The present invention uses conversational speech-to-text (speech recognition) and text-to-speech or pre-recorded voice over sounds along with graphic overlay to provide a general user guidance experience. When a website is accessed, special code is transferred to the client browser from the site server. If the client computer's application interface (API) supports speech recognition and/or text to speech, some or all speech conversions can be performed on the client side. If not, the speech processing can be performed on a dedicated private control site or by an external public site that provides speech processing services or as a distributed service in an on premise installation. After speech is converted to text, an artificial intelligence module, usually on the control site, attempts to determine intent—which is not mandatory, but definitely helps in many use-cases. Once intent is determined, the correct commands can be sent to the website to bring up proper pages and/or walkthroughs and/or answers. In addition, follow-up questions can be asked to clarify the user's intent and to continue the user through the actions they desire if needed in the context of the last sentence, for example:

User: "I want a device"
Machine: "Do you want to new device or to upgrade your own device?"
User: "new one"→This answer without a context doesn't mean anything but with a context it is sufficient.

DESCRIPTION OF THE FIGURES

Attention is now directed to several drawings the illustrate features of the present invention.

Several figures and illustrations have been provided to aid in understanding the present invention. The scope of the present invention is not limited to what is shown in the figures.

DESCRIPTION OF THE PREFERRED EMBODIMENTS

Figure 1:
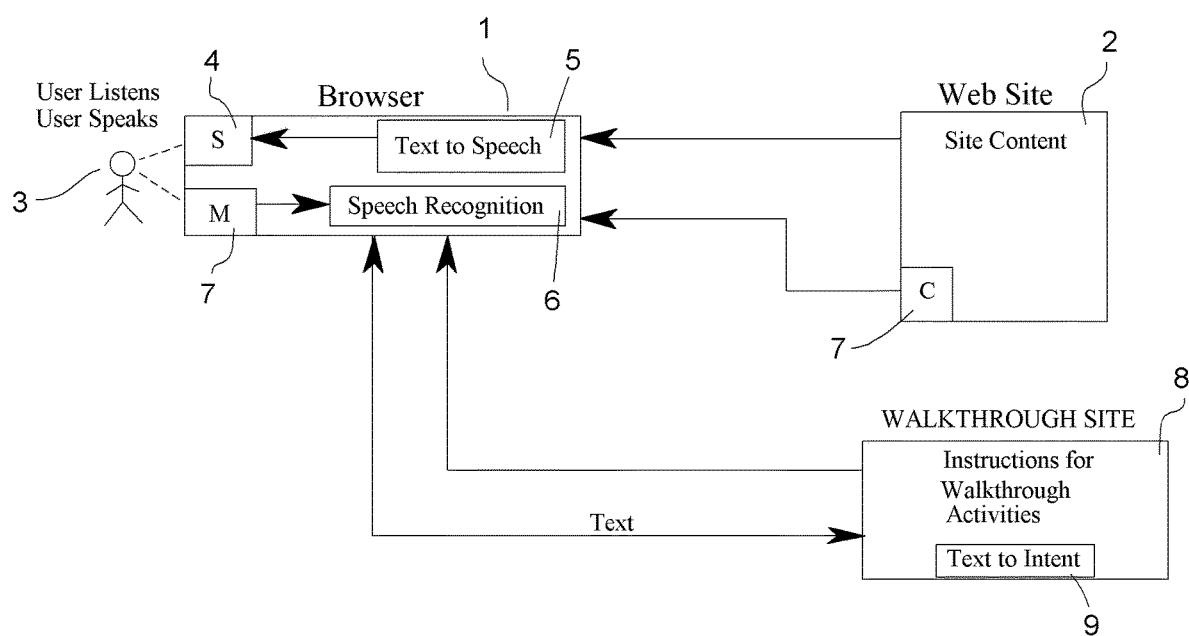
FIG. 1 shows an embodiment of the present invention where the User's computer/browser has speech-to-text and text-to-speech capability.

The present invention relates to a system and method for speech-controlled walk-through of websites. FIG. 1 shows a block diagram of an exemplary embodiment of the invention. A user 3 accesses a website 2 of a company or location he or she is interested in using their standard computer/browser 1. This can be any type of computer/browser including cellular telephones for both web and mobile native applications (apps). By prior agreement with the website owner, special code 7 is embedded in the website. Upon access, the special code 7 is transferred to the user's browser that directs the process of voice-controlled walk-through. Once the user 3 clicks on any button or play-trigger that initiates a voice-walkthrough, a voice and text prompt is given to the user 3 through a speaker or earphone 4. A play-trigger can be anything that initiates a walk-through such as a button on the page, after a timer, on a user-interaction, or an automatic start.

Once there is a play-trigger, there can be a prompt that asks the user 3 to either say or type what he or she would like to do. If the user 3 types the request, the text is captured and sent for intent determination. if the user speaks, (say through a microphone 7), speech recognition 5 converts the user's words to text. That text is then sent for intent determination. In the embodiment of FIG. 1, speech recognition 6 is performed by the user's computer using an application program interface (API) that exists on the user's computer. Questions or further comments coming back from either the website or a control website are usually printed on the screen and also converted to speech by a text-to-speech 6 module. In the embodiment of FIG. 1, this module is also located on the user's computer.

Text created by the user 3, either by speaking or by freeform typing is sent from the user's browser 1 to a control location or walk-through site 8 for intent determination. A text-to-intent engine 9 is typically located on that site. This is some form of artificial intelligence that can use dictionaries of expected words. If intent cannot be determined, text that asks more questions can be sent to the user where it is either printed or presented as speech. Even when intent is determined, further questions may be necessary. Also, further questions and statements can be used in the form of a running conversation to help the user complete the desired task.

For example, a user may enter a telephone provider's website. The site may ask (though text to speech): "How may I help you?". The user might answer: "I want to upgrade". Since this could mean several different things, i.e. upgrade service, upgrade a phone, a further question may be necessary: "Please state if you want to upgrade your service or your telephone." The user can then respond and be taken to the correct page on the site where the conversation can continue either by text alone, or by speech exchange.

As previously stated, the embodiment of FIG. 1 assumes that the speech recognition and text-to-speech capability rests on the user's computer through an API that code sent to the browser from the site can access (such as Java™).

Figure 2:
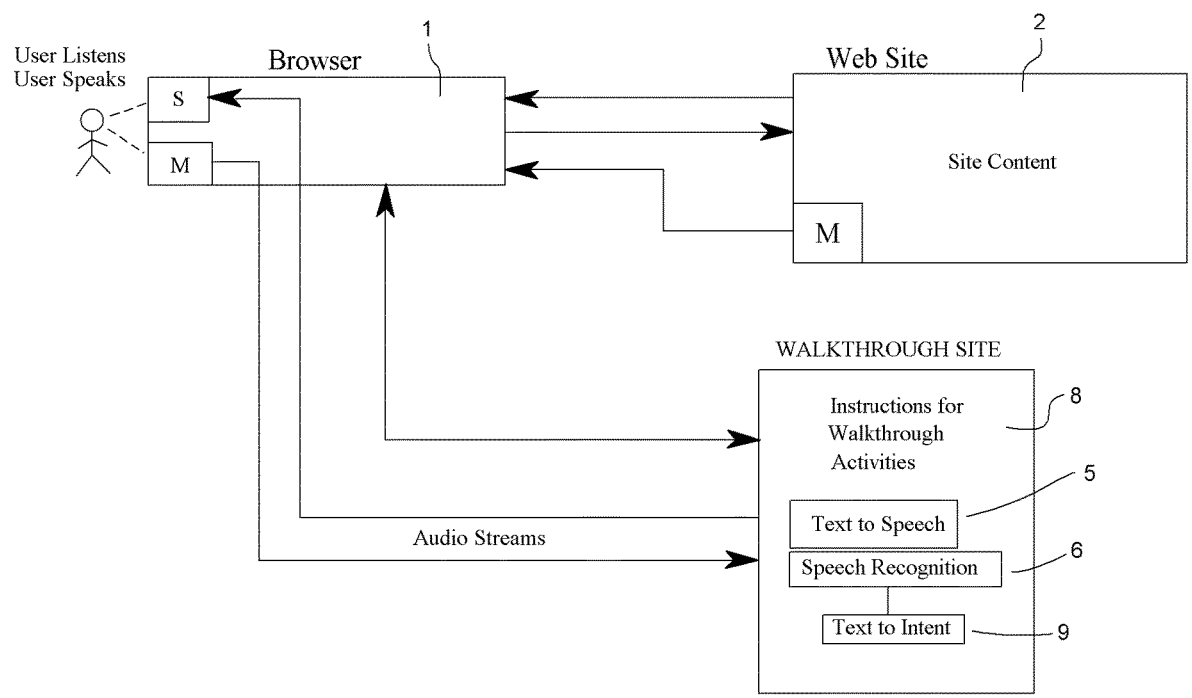
FIG. 2 shows an embodiment where the control site performs speech-to-text and text-to-speech.

FIG. 2 shows an embodiment of the present invention where the user's computer/browser 1 does not have speech processing capability, and where the audio from incoming speech is streamed to the walk-through control site 8 where speech recognition 5, text-to-speech 6 and intent determination 9 takes place.

Figure 3:
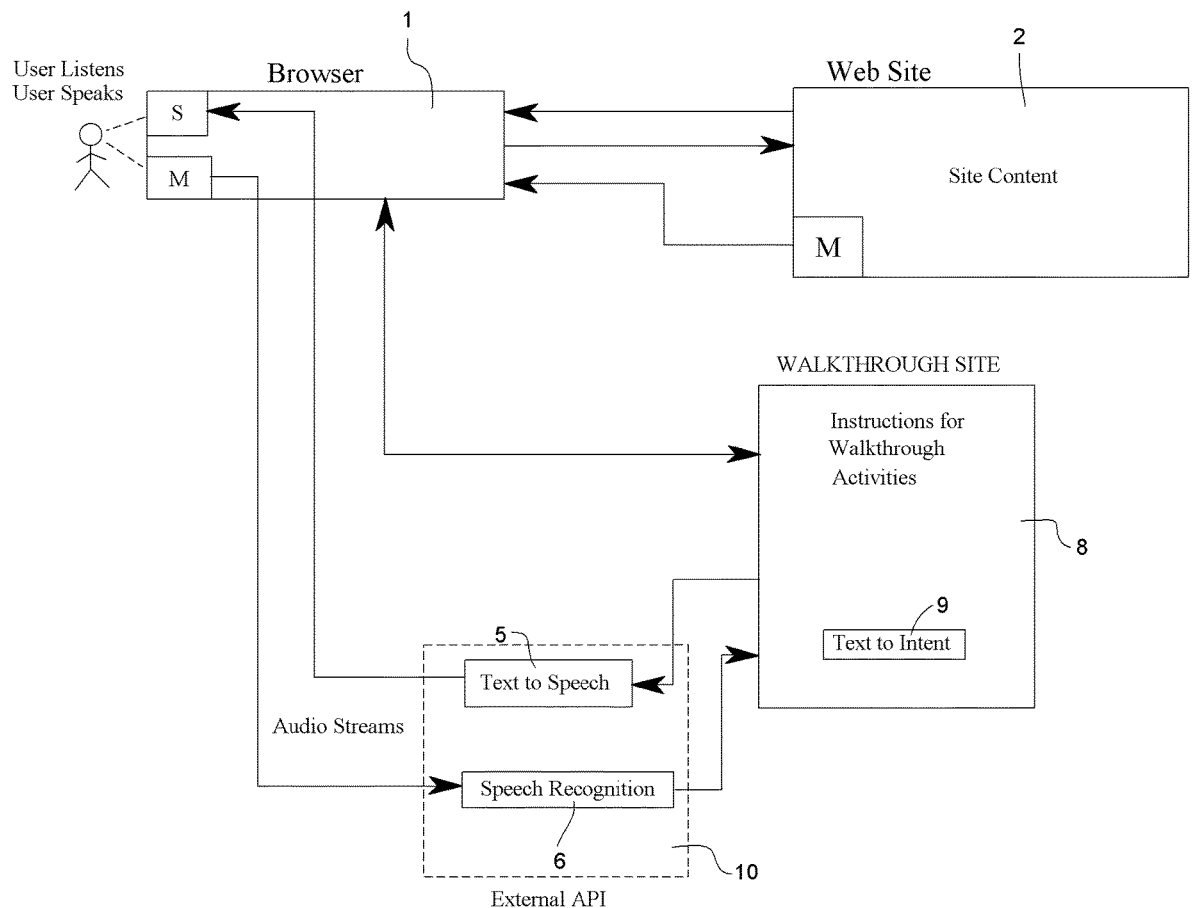
FIG. 3 shows an embodiment where a public site or site other than the control site performs speech-to-text and text-to-speech.

FIG. 3 shows another embodiment of the present invention where one or more external sites 10 is/are used to perform speech processing, namely speech recognition 6 and text-to-speech conversion 5. In this case, audio is streamed to the external site either directly to and from the user's browser 1 or to and from the walk-through control site 8. Such external sites provide APIs that allow either public users or subscribers to perform speech processing.

Summarizing the various embodiments:
Option 1 Speech Recognition API Exists on User Computer If the browser that the visitor is using supports the Speech Recognition API ability the present invention prefers to do the speech recognition on the client-side user's end. If the API does not exist, the system will automatically fallback to either option 2 or option 3.

Option 2 Sending the Audio to One or More Control Servers

If the browser that the user is using does not support the Speech Recognition API ability, the system will send the audio by using the navigator.getUserMedia( ) (or any other media capturing method) function in the client-side and send it to the server via webRTC or via REST API. From there the control server will send it either external services of speech to text and intent understanding or it will do both or the any part on the server. Optionally, parts of this can also be performed on the client-side depending upon capability.

Option 3 Sending the Audio Directly to an External Speech to Text Server

Another option that the present invention supports is sending the audio directly to a SaaS speech to text service to get the sentence with or without the intent.

Walk-Through Sequence

Once the walk-through control server has the text from the speech-to-text engines (option 1, 2 or 3), the system determines the intent (again either in the client or in the server), by using dictionaries of relevant words, that might exist in the sentence retrieved, or by using any other artificial intelligence method including neural networks, expert systems or any other method or technique of determining meaning from text.

By using both the intent and the sentence, the system displays (via audio and/or text) the next part of the conversation, whether it is another question that will clarify the visitor's intent, or just navigating the visitor to the right place/section and guiding him or her through the process while in a conversational process with the visitor by going through a walkthrough tree/graph like instruction set.

The walkthrough can still contain conditions, triggers, actions, custom JAVASCRIPT™ conditions and actions.

For each part of the walkthrough, where the system waits for a visitor to input or say his or her answer out loud, the system can change the dictionary and the configuration to the context of the answer that is applicable to the question. For example in the telephone company world:
System: "How can I help you"?
Visitor: "1 want a device"
System: If it is not clear if the visitor wants a new device or an upgrade to an existing device, the system can ask: 'Do you want a new device, or do you want to upgrade and existing device?"
Visitor: "Upgrade" or "upgrade existing device"—In this context just the word upgrade is enough to lead the visitor to upgrade a device, whereas if the visitor would say the word upgrade in the main context, the system can have other options for the word upgrade such as Upgrade a mobility data plan, upgrade a device and more.

If at any point the visitor's answer doesn't match any of the intents that are expected, the system can ask the visitor if they mind repeating his answer, and might even let the visitor choose from a textual representation of the options to avoid having the visitor repeat several times.

Sample Use Cases by Industry

The system's part of the dialog can always be represented in text, sound or both. The user/visitor part of the dialog can be demonstrated by speaking or by typing what he or she wants into a text input (div, text input, text area or any other html text input method).

Financial Services
Bank Sample scenario with sample script:
User clicks on a Help button in the financial services website.
System: "How can I help you?"
User: "I would like to transfer money"
System: "Would you like to transfer it to someone in the USA or someone out of the country?"
User: "In the USA please"
System: "Thank you, I am taking you to the right place"—The system then redirects the user to the right area of the website. After redirect is completed:
System: "In this area you can transfer money to anyone that has a US bank account. Where would you like the funds to be transferred, and for how much? Feel free to say it out loud or please enter the recipient bank account here (while highlighting the bank account field) and the amount here (while highlighting the amount field)".
User either enter the fields or says: "I want to transfer two hundred fifty three dollars to Jessica Smith to account number two two five three six three in chase".
System (if user interaction was performed with voice, the system enters all the fields): "Please go over these details. If they are correct, either click here (highlight the next button) or say continue to proceed"
User: looks verifies and says "Continue please"
System: The system then takes the user to the next page of the confirmation by clicking on the next button programmatically.
System: "Please review this transfer, if you approve it, it might take the recipient up to two business days to see it in your balance since it is after business hours. If you want to transfer to chase, click here or say "Yes I approve this wire"?"
User: "Yes, I approve this wire"
System: clicks on approve for the user System: "Thanks for using our guided wire transfer process at "MyBank", If you need to do anything else today, I'd like to offer you more guidance, if not, we had a pleasure serving you"

Telecommunication
A sequence might start with (for example):
Visitor/User clicks on a Help button in the telco/cables/etc website.
System: "How can I help you?"
User sample inquires for help might be:
"I forgot my password"
"I would like a new device"
"I would like to see which mobility plans you offer"
"I want a fast unlimited data plan"

Insurance
A sequence might start with (for example):
Visitor/User clicks on a Help button in the insurance company's website.
System: "How can I help you?"
User sample inquires for help might be:
"I forgot my password"
"I would like to get insurance for ski traveling"
"How do I know when my insurance policy is over"
"How much allowance will I get at retirement age?"

Utility Providers
A sequence might start with (for example):
Visitor/User clicks on a Help button in the utility company's website.
System: "How can I help you?"
User sample inquires for help might be:
"I forgot my password"
"I want to pay my electricity bill"
"I want to know how come I paid so much this month vs the last month"
"How do I set up auto payments for my charges"

Healthcare
A sequence might start with (for example):
Visitor/User clicks on a Help button in the healthcare company's website.
System: "How can I help you?"
User sample inquires for help might be:
"I want to set an appointment for an orthopedic surgeon on may 5th"
"I want to see my blood test results"

Travel and Hospitality
A sequence might start with (for example):
Visitor/User clicks on a Help button in the travel/hospitality company's website.
System: "How can I help you?"
User sample inquires for help might be:
"I want to fly out to Boston Logan international airport on the 25th of July and return six days after"
"I want to book a hotel in the radius of 5 km from the center of Barcelona"

Education
A sequence might start with (for example):
Visitor/User clicks on a Help button in the education organization's website.
System: "How can I help you?"
User sample inquires for help might be:
"I want to request a student scholarship"
"I want to enroll to 'advanced chemistry 2 in July"
"I want to know the opening hours of the main library"
"I want to upload my homework to the portal"

Public Sector Organizations
A sequence might start with (for example):
Visitor/User clicks on a Help button in the public sector organization's website.
System: "How can I help you?"
User sample inquires for help might be:
"I want to fill in my yearly taxes"
"I want to apply for a visa to fly out to Moscow"

Software Providers
A sequence might start with (for example):
Visitor/User clicks on a Help button in the public sector organization's website.
System: "How can I help you?"
User sample inquires for help might be:
"I want to renew my SSL certificate"
"I want to register a new domain"
"I want a report of how many users visited to my website"

The present invention provides a system and method that makes it easy for a user or visitor to a website to navigate to correct pages and accomplish one or more tasks by voice interaction in a conversational mode.

Several embodiments of the system can accomplish this. Namely, speech can be processed at the client end on the user computer/browser if that capability exists. If not, audio can be streamed mono-directionally or bidirectionally to either a walk-through control site or to an external remote API that provides speech processing services. The totality of the invention provide a convenient system and method for navigating websites using voice.

Several descriptions and illustrations have been presented to aid in understanding the present invention. One with skill in the art will realize that numerous changes and variations may be made without departing from the spirit of the invention. Each of these changes and variations is within the scope of the present invention.

We claim:

1. A method for providing voice-controlled website walk-through comprising:
providing a voice prompt to a user upon entering the website using text to voice conversion or a recorded voice prompt;
receiving a voice request from the user;
converting the voice request to text using voice recognition;
analyzing the text with an artificial intelligence module to determine intent:
(a) if intent can be determined from the text, presenting a webpage to the user that relates to the intent;
(b) if intent cannot be determined from the initial reply, asking a voice question using text to voice conversion or a recorded voice question;
(c) receiving a voice response from the user;
(d) converting the voice response to text using voice recognition;
(e) Repeating steps (a)-(d).

2. The method of claim 1 wherein voice recognition and text-to-voice conversion is performed on the user's computer.

3. The method of claim 1 wherein voice recognition and text-to-voice conversion is performed at a website server.

4. The method of claim 1 wherein voice recognition and text-to-voice conversion is performed on a third-party computer.

5. The method of claim 1 wherein the artificial intelligence module includes dictionaries of words, a neural network or an expert system.

6. A method of voice guided website walkthrough comprising:
   (a) asking an introductory voice question to a user upon the user accessing a website using text to voice conversion or an initial recorded voice question;
   (b) receiving an initial voice reply from the user;
   (c) converting the initial voice reply to initial text using voice recognition;
   (d) analyzing the initial text with an artificial intelligence module to determine intent;
   (e) if intent can be determined from the initial reply, presenting a webpage to the user that relates to the intent;
   (f) if intent cannot be determined from the initial reply, asking a further voice question using text to voice conversion or a recorded voice question; (g) receiving a voice answer from the user;
   (h) converting the voice reply to response text using voice recognition;
   (i) analyzing the response text with the artificial intelligence module to determine intent;
   (j) if intent can be determined from the response text, presenting a webpage to the user that relates to the intent;
   (k) if intent cannot be determined from the reply text repeating steps (f)-(k).

7. The method of claim 6 wherein if intent cannot be determined after repeating steps (f)-(k) a predetermined number of times, the user is presented with a textual representation of options.

8. The method of claim 6 wherein the artificial intelligence module includes dictionaries of words, a neural network or an expert system.

9. The method of claim 6 wherein voice recognition and text-to-voice conversion is performed on the user's computer.

10. The method of claim 6 wherein voice recognition and text-to-voice conversion is performed at a website server.

11. The method of claim 6 wherein voice recognition and text-to-voice conversion is performed on a third-party computer.

12. A method of voice guided website walkthrough comprising:
   transmitting an initial text question from a server to a user computer upon a user entering a website;
   causing the user computer to convert the initial text question to an initial voice question and to present the initial voice question to the user;
   allowing the user computer to receive a voice response from the user and to convert the voice response to a text response;
   allowing the user computer to transmit the text response to the server;
   analyzing the initial text response at the server to determine a user intent;
   (a) if intent can be determined from the text response, presenting a webpage to the user that relates to the intent;
   (b) if intent cannot be determined from the text response, asking a voice question using text to voice conversion or a recorded voice question;
   (c) receiving a voice response from the user;
   (d) converting the voice response to a text response using voice recognition;
   (e) Repeating steps (a)-(d).

13. The method of claim 12 wherein the analyzing is performed by an artificial intelligence module.

14. The method of claim 13 wherein the artificial intelligence module includes dictionaries of words, a neural network or an expert system.

* * * * *